(12) United States Patent
Frotz

(10) Patent No.: US 8,240,739 B2
(45) Date of Patent: Aug. 14, 2012

(54) SUN SHIELD

(75) Inventor: Thomas Frotz, Burscheid (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 0 days.

(21) Appl. No.: 12/665,990

(22) PCT Filed: Jun. 18, 2008

(86) PCT No.: PCT/EP2008/004896
§ 371 (c)(1),
(2), (4) Date: Apr. 22, 2010

(87) PCT Pub. No.: WO2009/000451
PCT Pub. Date: Dec. 31, 2008

(65) Prior Publication Data
US 2010/0201149 A1 Aug. 12, 2010

(30) Foreign Application Priority Data

Jun. 28, 2007 (DE) .................. 10 2007 030 112
Nov. 21, 2007 (DE) .................. 10 2007 056 181

(51) Int. Cl.
*B60J 3/02* (2006.01)
(52) U.S. Cl. .................................................. 296/97.8
(58) Field of Classification Search ............... 296/97.6, 296/97.8
See application file for complete search history.

(56) References Cited

U.S. PATENT DOCUMENTS

| | | | |
|---|---|---|---|
| 3,853,370 A | 12/1974 | Barnhart | |
| 4,874,938 A | 10/1989 | Chuang | |
| 5,409,284 A * | 4/1995 | Mahler | 296/97.4 |
| 5,791,721 A * | 8/1998 | Lin | 296/97.8 |
| 5,873,621 A | 2/1999 | Kuighadush et al. | |
| 6,109,330 A * | 8/2000 | Crisp | 160/370.22 |
| 6,189,948 B1 * | 2/2001 | Lin | 296/97.4 |
| 6,488,328 B2 * | 12/2002 | Quapil | 296/97.8 |
| 7,455,345 B1 * | 11/2008 | Kim | 296/97.4 |

FOREIGN PATENT DOCUMENTS

| | | |
|---|---|---|
| DE | 3341509 A1 | 5/1985 |
| DE | 19633192 C1 | 2/1998 |
| DE | 19716084 A1 | 10/1998 |
| DE | 198 02 073 A1 | 7/1999 |
| DE | 10242173 * | 9/2002 |
| DE | 69717088 T2 | 9/2003 |
| DE | 20320593 U1 | 12/2004 |
| EP | 1164037 A2 | 12/2001 |
| WO | WO 89/08823 A1 | 9/1989 |

OTHER PUBLICATIONS

International Search Report corresponding to PCT/EP2008/004896, dated Sep. 16, 2008, 3 pages.

* cited by examiner

*Primary Examiner* — Dennis Pedder
(74) *Attorney, Agent, or Firm* — Foley & Lardner LLP

(57) ABSTRACT

The invention relates to a sun shield for a vehicle, wherein the sun shield can be rotated from a storage position about a horizontal rotational axis in front of the windshield into at least one first shading position. The sun shield comprises a sun shield body, whereon a shield segment is mounted in a movable manner. The present invention further relates to a method for retracting and extending a shield segment relative to a sun shield body.

14 Claims, 1 Drawing Sheet

SUN SHIELD

CROSS-REFERENCE TO RELATED APPLICATIONS

Figure 1A:
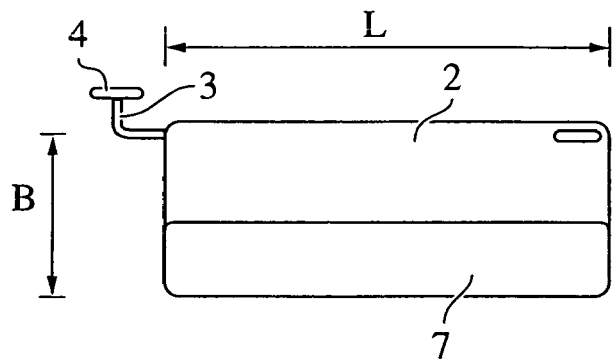

This application is a National Stage application of PCT/EP2008/004896, filed Jun. 18, 2008, which claims the benefit and priority of German Patent Application 10 2007 030 112.1, filed Jun. 28, 2007, and German Patent Application 10 2007 056 181.6, filed Nov. 21, 2007. The foregoing applications are incorporated by reference herein in their entirety.

The invention relates to a sun shield for a vehicle, said sun shield being pivotable about a horizontal axis of rotation from a storage position at least into a first shading position in front of the windshield. The sun shield has a sun shield body on which a shield segment is mounted in a displaceable manner. Furthermore, the present invention relates to a method for retracting and extending a shield segment relative to a sun shield body.

The sun shields of the type in question are known from the prior art, for example from DE 33 41 509, A1, DE 697 17 088, T2,, DE 203 20 593, U1,, DE 197 16 084, A1 and DE 196 33 192, C1. However, the sun shields disclosed therein have the disadvantage of being of comparatively complicated design, of the mounting of the sun shield on the vehicle being subjected to a comparatively high load in particular during the displacement of the shield segment and/or of having a tendency to be noisy.

It was therefore the object of the present invention to provide a sun shield which does not have the disadvantages of the prior art.

The object is achieved by a sun shield for a vehicle, with a sun shield body on which a shield segment is mounted in a displaceable manner, said shield segment being reversibly transferable from a retracted position into an extended position, wherein said sun shield has a spring means which prestresses the shield segment into the extended position thereof.

The sun shield according to the invention is pivotable about a horizontal axis of rotation from a storage position at least into a first shading position in front of the windshield. However, it is preferably also transferable into a second shading position substantially parallel to the side window. It is provided that the sun shield is designed such that it is divided, preferably along the longitudinal extent thereof, such that one segment of the sun shield can be shifted reversibly in a direction preferably transversely with respect to the longitudinal extent. For example, the transverse extension of the sun shield can thereby be made smaller in the storage position than in the first shading position. This advantage can also be used when the sun shield is pivoted about a vertical axis from the first shading position into a second shading position in front of the side window of the vehicle.

The division along the longitudinal extent of said sun shield preferably penetrates only a partial region, for example only the front or rear shell, of the sun shield. In particular, the division and the displacement of the segment are provided in such a manner that there is never a slit between the sun shield body and the displaceable segment through which sunbeams may penetrate.

The shield body and the shield segment very particularly preferably overlap at least partially in every position.

Furthermore, according to the invention, the sun shield has a spring means with which the shield segment is prestressed into the extended position thereof and which, when required, drives the transfer of the shield segment into the extended position thereof. This embodiment has the advantage that the sun shield is never automatically reduced in size and therefore results in an unexpected dazzling in particular of the vehicle driver. In addition, the mounting of the sun shield according to the invention on the vehicle is subjected to a smaller amount of load because the shield segment is pressed out of the shield body rather than having to be pulled out therefrom.

The transfer of the sun shield into the extended position is preferably braked, particularly preferably by a rotary brake.

The sun shield preferably has a guide along which the shield segment is retracted and extended.

The spring means preferably interacts with an articulated arm and drives the latter. The articulated arm is particularly preferably a rotary lever.

In a further preferred embodiment, the articulated arm is connected to the shield segment, in particular to the guide thereof.

The spring means, the articulated arm and/or the guide are preferably formed in duplicate. This preferred embodiment of the present invention improves in particular the movement of the shield segment. In this embodiment, the movement of the two articulated arms is particularly preferably synchronized. In an embodiment of the articulated arms as rotary articulated arms, this can take place, for example, by means of complementary interlocking means which are arranged on the two articulated arms and are in engagement, for example meshed, with each other. The synchronization of the two articulated arms prevents the shield segment from tilting during the retraction and/or extension operation.

According to another or a preferred subject matter of the present invention, the shield segment can be locked in the retracted and/or extended position thereof by means of a latching mechanism, preferably a pressure-actuated latching mechanism. The latching of the shiftable part in the retracted and/or extended position advantageously takes place by means of a pressure-actuated latching, similar to a pressure-actuated latching mechanism for the reservoir of a pressure-actuated ballpoint pen, the pressure being applied in particular to the lower edge of the separated shield segment. The latching in both positions increases the safety of the vehicle and/or reduces the amount of noise produced.

A further subject matter of the present invention is a method for retracting and extending a shield segment relative to a sun shield body, in which the retraction and extension take place by means of a pressure pulse.

The extension preferably takes place by means of a short pressure pulse which deactivates the latching. A driving means, for example a spring, then presses the shield segment into the extended position thereof. By contrast, the retraction takes place by means of a longer pressure pulse in which the operation to transfer the shield segment into the retracted position is carried out. Particularly preferably, in said operation, a spring is also tensioned.

The invention is explained below with reference to FIGS. 1-4. Said explanations are merely by way of example and do not limit the general inventive concept. The explanations apply equally to all of the subjects of the present invention.

Figure 1B:
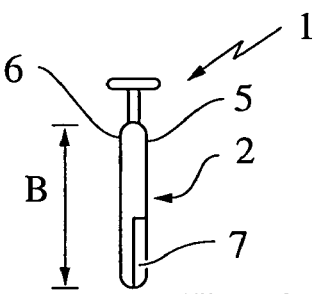
Figure 2A:
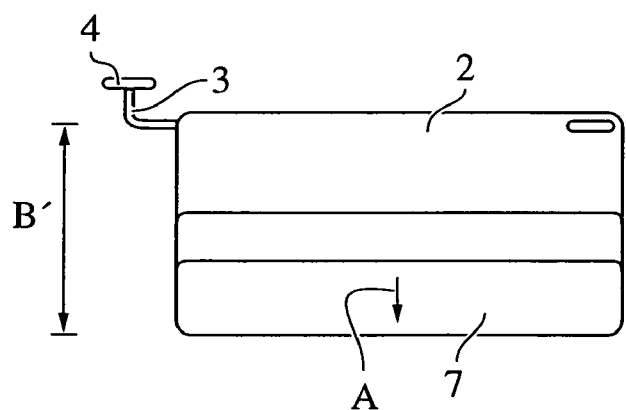
Figure 2B:
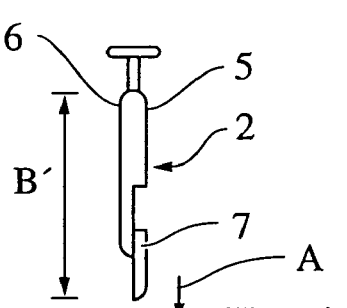
Figure 3:
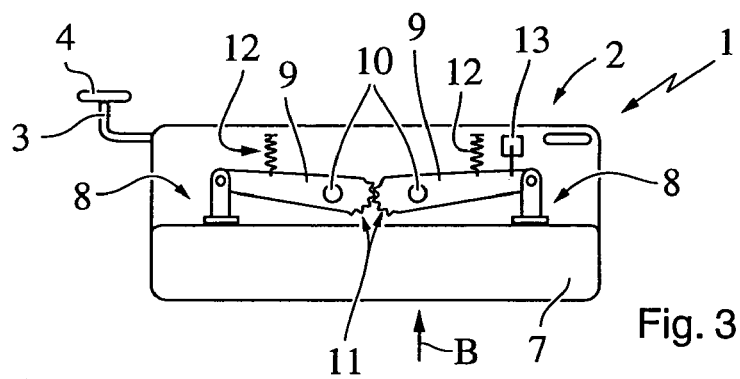
Figure 4:
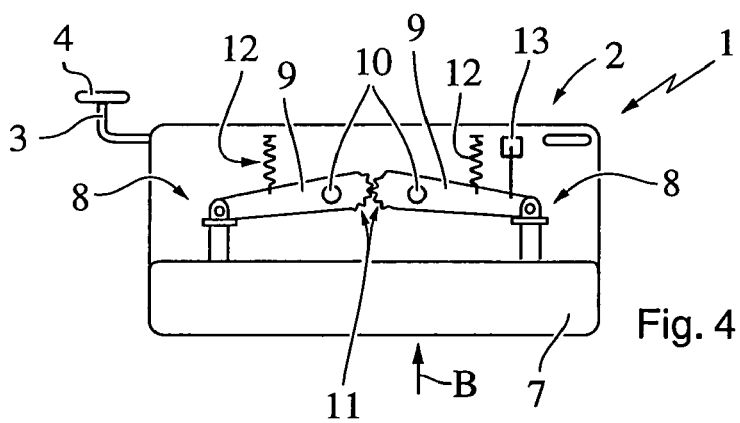

FIG. 1a, shows the sun shield according to the invention with the shield segment in a retracted position, FIG. 1b, shows the sun shield according to FIG. 1a in side view, FIG. 2a, shows the sun shield according to the invention with the shield segment in an extended position, FIG. 2b, shows the sun shield according to FIG. 2a in side view, FIG. 3 shows the movement mechanism of the shield segment in a retracted position, FIG. 4 shows the movement mechanism of the shield segment in an extended position.

FIG. 1 shows the sun shield 1 according to the invention in the first shading position thereof in a view in the direction of travel (FIG. 1a) and transversely with respect thereto (FIG. 1b). The sun shield 1 comprises a sun shield body 2 with a longitudinal extent L and a transverse extension B, and also comprises an angled sun shield spindle 3 with bearing lugs 4. The sun shield body 2 has a front half, the front shell 5, and a rear half, the rear shell 6, which shells can be manufactured separately, for example, by injection molding. The front shell 5 is of divided design along the longitudinal extent of the sun shield body 2 such that a narrow shield segment 7 is formed in the region of the lower edge of the sun shield body 2. Said shield segment 7 can be shifted away from the sun shield spindle 3 as far as a transverse extension B' in order to increase the shading region, as illustrated by the arrow A. Said extended position of the shield segment 7 as illustrated in FIGS. 2A and 2B which also show the shading position.

As is apparent from FIG. 3, the shield segment 7 is mounted via guides 8 in a manner such that it is displaceable transversely with respect to the longitudinal extent L. Two articulated arms 9 are arranged mirror-symmetrically with respect to each other in the sun shield body 2, said articulated arms being pivotable in the vicinity of the center of the sun shield body 2 about two spaced-apart axes of rotation 10 and being synchronized via intermeshing toothings 11. The ends of the articulated arms 9 are connected rotatably to the guides 8 and are prestressed in the direction of the extended position via springs 12. One of the articulated arms 9 is furthermore connected to a pressure-actuated latching mechanism 13 which initially holds the articulated arm 9 in the retracted position (FIG. 3). However, when pressure is applied to the lower edge of the shield segment 7 (arrow B) counter to the direction of pressure of the springs 12, the shield segment 7 is shifted by the springs 12 and the articulated arms 9 into the extended position (FIG. 4) and is preferably likewise locked there, in particular by the pressure-actuated latching mechanism 13. The transfer speed of the shield segment from the retracted position into the extended position is preferably reduced at least temporarily by a brake, in particular a rotary brake. Upon a renewed pressure in the direction of the arrow B, the shield segment 7 is pushed again into the sun shield body 2 and held by the pressure-actuated latching mechanism 13. In the process, the springs 12 are prestressed again. A pressure-actuated latching mechanism 13 of this type is known, for example, from the publication DE 1 291 258, A. Said publication is hereby produced as a reference and is therefore considered to be part of the disclosure.

LIST OF REFERENCE NUMBERS

1 Sun shield
2 Sun shield body
3 Sun shield spindle
4 Bearing lug
5 Front shell
6 Rear shell
7 Shield segment
8 Guide
9 Articulated arm
10 Axis of rotation
11 Toothing
12 Spring
13 Pressure-actuated latching mechanism

The invention claimed is:

1. A sun shield for a vehicle, the sun shield comprising:
a sun shield body;
a shield segment mounted on the sun shield body in a displaceable manner, the shield segment being reversibly transferrable from a retracted position into an extended position;
first and second articulated arms having first ends pivotally connected relative to the sun shield body and second ends pivotally connected relative to the shield segment, the first end of the first articulated arm having a first toothing and the first end of the second articulated arm having a second toothing, the first toothing being in meshing engagement with the second toothing; and
a first spring interacting with one of the first and second articulated arms to prestress the shield segment in the extended position,
wherein movement of the first articulated arm is synchronized with movement of the second articulated arm.

2. The sun shield of claim 1, further comprising first and second guides connected to the shield segment, wherein the second ends of the first and second articulated arms are pivotally connected to the shield segment at the first and second guides respectively.

3. The sun shield of claim 1, further comprising a pressure actuated latching mechanism connected to at least one of the first and second articulated arms and configured to hold the first and second articulated arms in the retracted position.

4. The sun shield of claim 3, wherein the pressure actuated latching mechanism is configured to be released by applying pressure to a lower edge of the shield segment.

5. The sun shield of claim 3, wherein the pressure actuated latching mechanism is also configured to hold the first and second articulated arms in the extended position.

6. A sun shield for a vehicle, the sun shield comprising:
a sun shield body having a front shell and a rear shell;
a shield segment mounted on the sun shield body in a displaceable manner, the shield segment being reversibly transferrable from a retracted position into an extended position, the shield segment overlapping the rear shell in both the retracted and extended positions;
first and second articulated arms having first ends pivotally connected relative to the sun shield body and second ends pivotally connected relative to the shield segment; and
a first spring interacting with one of the first and second articulated arms to prestress the shield segment in the extended position,
wherein the first end of the first articulated arm has a first toothing and the first end of the second articulated arm has a second toothing;
wherein movement of the first articulated arm is synchronized with movement of the second articulated arm through the toothings.

7. The sun shield of claim 1, wherein synchronization of the first and second articulated arms prevents the shield segment from tilting when transferring between the retracted and extended positions.

8. The sun shield of claim 6, wherein the first toothing is in meshing engagement with the second toothing such that the intermeshing of the first and second toothings provides the synchronized movement of the first and second articulated arms.

9. The sun shield of claim 6, further comprising first and second guides connected to the shield segment, wherein the second ends of the first and second articulated arms are pivotally connected to the shield segment at the first and second guides respectively.

10. The sun shield of claim 6, further comprising a pressure actuated latching mechanism connected to at least one of the first and second articulated arms and configured to hold the first and second articulated arms in the retracted position.

11. The sun shield of claim 10, wherein the pressure actuated latching mechanism is configured to be released by applying pressure to a lower edge of the shield segment.

12. The sun shield of claim 10, wherein the pressure actuated latching mechanism is also configured to hold the first and second articulated arms in the extended position.

13. The sun shield of claim 6, wherein synchronization of the first and second articulated arms prevents the shield segment from tilting when transferring between the retracted and extended positions.

14. A sun shield for a vehicle, the sun shield comprising:
a sun shield body having a front shell and a rear shell;
a shield segment mounted on the sun shield body in a displaceable manner, the shield segment being reversibly transferrable from a retracted position into an extended position, the shield segment overlapping the rear shell in both the retracted and extended positions;
first and second articulated arms having first ends pivotally connected relative to the sun shield body and second ends pivotally connected relative to the shield segment;
a first spring interacting with one of the first and second articulated arms to prestress the shield segment in the extended position; and
a pressure actuated latching mechanism connected to at least one of the first and second articulated arms and configured to hold the first and second articulated arms in the retracted position;
wherein movement of the first articulated arm is synchronized with movement of the second articulated arm through a first toothing of the first articulated arm and a second toothing of the second articulated arm.

* * * * *